(12) United States Patent
Yoshimoto

(10) Patent No.: US 6,920,467 B1
(45) Date of Patent: Jul. 19, 2005

(54) AVOIDING UNWANTED SIDE-EFFECTS IN THE UPDATING OF TRANSIENT DATA

(75) Inventor: Masahiko Yoshimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/720,170

(22) Filed: Sep. 25, 1996

Related U.S. Application Data

(63) Continuation of application No. 08/345,708, filed on Nov. 22, 1994, now abandoned.

(30) Foreign Application Priority Data

Nov. 26, 1993 (JP) ............................................. 5-296248

(51) Int. Cl.[7] .............................................. G06F 17/30
(52) U.S. Cl. ........................ 707/202; 707/10; 707/204; 714/5
(58) Field of Search .................. 707/3, 5, 10, 100, 707/102, 200, 202, 203, 204; 711/162; 714/5; 718/100, 101

(56) References Cited

U.S. PATENT DOCUMENTS

| | | | | |
|---|---|---|---|---|
| 5,008,786 A | * | 4/1991 | Thatte ........................ | 711/162 |
| 5,043,871 A | * | 8/1991 | Nishigaki et al. ........... | 707/202 |
| 5,163,148 A | * | 11/1992 | Walls ......................... | 707/204 |
| 5,327,551 A | * | 7/1994 | Kaneko ........................ | 714/5 |
| 5,410,700 A | * | 4/1995 | Fecteau et al. ............. | 718/100 |
| 5,437,026 A | * | 7/1995 | Borman et al. ............. | 707/202 |
| 5,504,899 A | * | 4/1996 | Raz ............................. | 707/10 |
| 5,504,900 A | * | 4/1996 | Raz ............................. | 707/10 |
| 5,701,480 A | * | 12/1997 | Raz ............................. | 718/101 |

* cited by examiner

Primary Examiner—Shahid Alam
(74) Attorney, Agent, or Firm—Fitzpatrick, Cella, Harper & Scinto

(57) ABSTRACT

An information processing apparatus includes memory for storing a plurality of data; updating means for updating data stored in the memory in a transaction; and setting means for setting, with regard to each of the plurality of data stored in the memory, whether updated data updated by the updating means is to be validated or invalidated at abortion of the transaction, respectively. The setting means performs its setting in advance of the transaction. Saving means saves data, for which updated data has been set to be invalidated at abortion of the transaction by the setting means, except for data for which updated data has been set to be validated at abortion of the transaction by the setting means, before execution of data update by the updating means in the transaction. Control means invalidates the updated data set to be invalidated by restoring the data saved the saving means and validates the updated data set to be validated by maintaining the updated data for which data before execution of updating has not been saved at an end of the transaction if the transaction has been aborted.

16 Claims, 6 Drawing Sheets

AVOIDING UNWANTED SIDE-EFFECTS IN THE UPDATING OF TRANSIENT DATA

This application is a continuation, of application Ser. No. 08/345,708 filed Nov. 22, 1994, now abandoned.

BACKGROUND OF THE INVENTION

This invention relates to an information processing method and apparatus and, more particularly, to an information processing method and apparatus for managing persistent data, the state of which is maintained even after execution of an application or the like, as well as transient data, the existence whereof vanishes with the end of execution of an application or the like.

Two types of data generally are mixed in database applications. One type is persistent data located in the database and shared by a plurality of applications, and the other type of data is transient data, which exists only during execution of the database application and vanishes with the end of the application.

With regard to persistent data, the conventional practice is to use transactions as a mechanism for updating the data while assuring its consistency. In an application, a transaction is started by a transaction-start command. It is possible to refer to the persistent data and to update the same during execution of the transaction. There are two ways to terminate transactions. One is a commit operation in which the content of the change during the transaction is reflected in the database, and the other is an abort operation in which the content of the change is discarded without updating the database.

Furthermore, the abort of a transaction includes a case in which abort is started internally by the application itself and a case in which abort is started externally in order to overcome a deadlock. In the case where the abort operation is started externally, a method is often used in which the burden upon the application for dealing with the abort is alleviated by implementing retry automatically.

In the prior art, the consistency of persistent data in the abort and retry of a transaction is assured, but undesirable side effects occur with regard to transient data. For example, if, in processing for counting up the number of elements' in a set of certain persistent data, the number of elements is transient data, a side effect occurs in which some of the elements are counted up redundantly in response to the occurrence of transaction retry unless the number of elements is initialized at the time of an abort. Generally, in order to prevent side effects in transient data at the time of an abort, it is necessary for the application to sense the abort of a transaction and to reinitialize the transient data appropriately. As a result, the burden involved in developing applications is greater, and often the result is erroneous operation and lower reliability.

There are also instances in which use is made of the very side effect brought about by abort of a transaction. For example, in a case where the number of retries of a transaction is counted, the counter itself becomes transient data, but of course initializing such transient data when the transaction is retried makes it impossible to attain the original objective of counting the retries. Accordingly, in order to handle transient data in a transaction, there is a necessity for means for distinguishing between transient data to be initialized at retry of a transaction and transient data not to be so initialized.

SUMMARY OF THE INVENTION

Accordingly, an object of the present invention is to provide an information processing method and apparatus in which, when processing for updating persistent data has been canceled, control can be executed to preserve or discard the content of the update (these terms are used herein to mean, respectively, (1) to keep the data as updated and (2) to keep the pre-updated values, discarding the updated values) thus far for each item of transient data.

Another object of the present invention is to provide an information processing method and apparatus in which, in processing for updating data which includes persistent data and transient data, it is possible to prevent the transient data from being subjected to side effects when the content of an update of persistent data has been discarded.

Still another object of the present invention is to provide an information processing method and apparatus in which, when a transaction has been canceled during updating of persistent data by the transaction, control can be executed to preserve or discard the content of the update for each item of transient data at the moment of cancellation of the transaction.

A further object of the present invention is to provide an information processing method and apparatus for saving transient data which regard to data designated at the start of a transaction, discarding the content of an update by restoring the saved data at cancellation of the transaction, and preserving the content of an update with regard to data not saved, thereby making it possible to control preservation and discarding of content of an update for each item of data.

A further object of the present invention is to provide an information processing method and apparatus for managing data in page units (i.e., in units of pages) and, when data update processing has been canceled, for designating, in page units, whether the content of an update is to be preserved or not.

Yet another object of the present invention is to provide an information processing method and apparatus for managing data in page units and, with regard to a page for which discarding of content of an update has been designated at cancellation of data update processing, for saving the data when the data is accessed in the transaction, thereby raising the efficiency of save processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described with reference to the accompanying drawings.

First Embodiment

Figure 1:
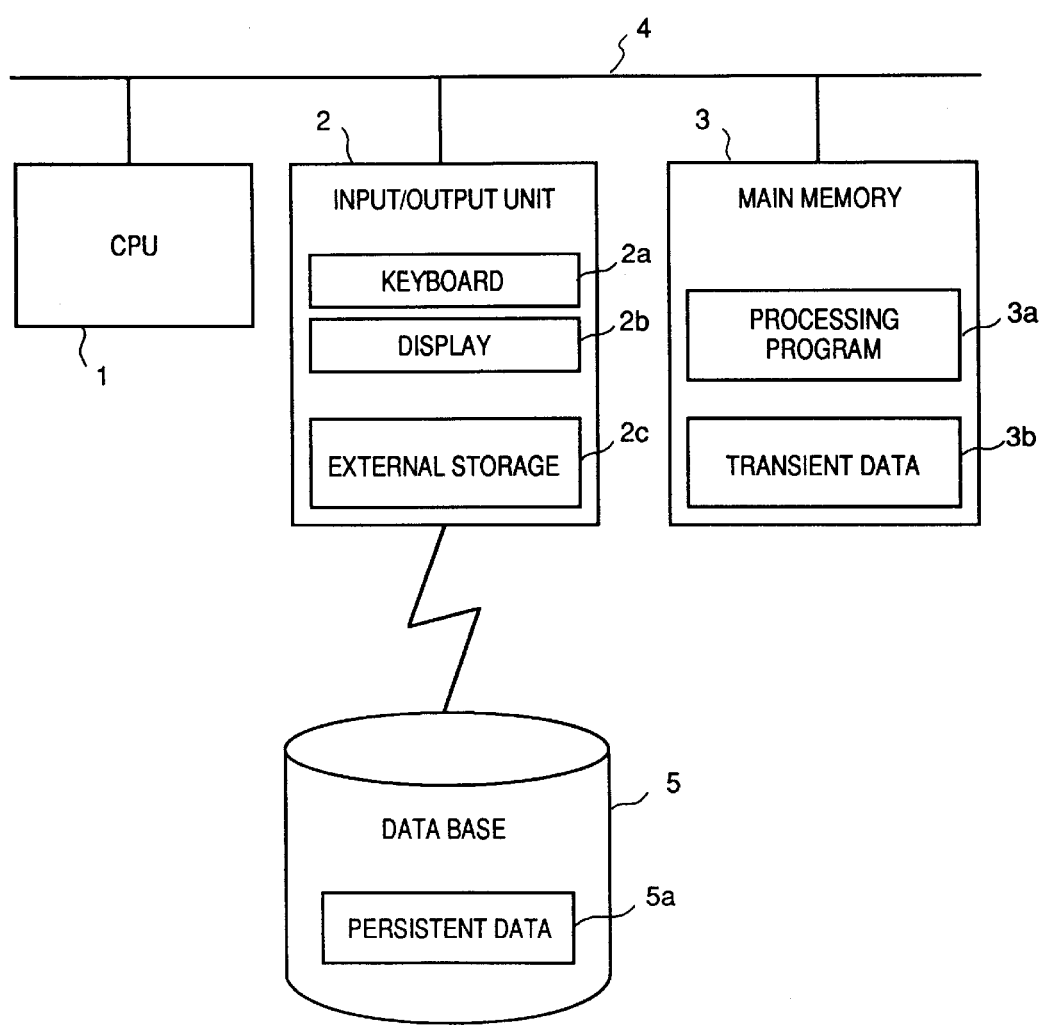
FIG. 1 is a diagram illustrating the configuration of a computer system according to a first embodiment of the present invention.

FIG. 1 is a diagram showing the configuration of a computer system according to a first embodiment of the invention. The system includes a CPU 1 for performing overall control of the system by executing a processing program 3a (described later) stored in a main memory 3. Data processing according to this embodiment described below is executed by the CPU 1. The system further includes an input/output unit 2 comprising a keyboard 2a, a display 2b, an external storage 2c and a network adapter (not shown). The main memory 3 temporarily stores the processing program 3a of an application program or the like dealt with in this embodiment, as well as transient data 3b. The transient data generally is stored in a RAM.

A computer bus 4 interconnects the above-mentioned components and allows exchange of data, addresses, control data, etc. A data bus 5 preserves persistent data 5a and the like. The persistent data 5a is placed on an external storage device such as a disk or in a database management system connected by the network. A mechanism is provided for supplying the persistent data to an application by a well-known technique.

The database system of this embodiment will now be described by dividing the data processed into the following three categories:

(1) Persistent Data 5a

Reference/updating externally of a transaction is not allowed.

(2) Transient Data For Which Side Effects Are Allowed

Reference/updating allowed irrespective of whether internally or externally of transaction. In this case, updating outside the transaction usually is effective. Updating within a transaction is effective only in case of a commit operation.

(3) Volatile Data For Which Side Effects Are Allowed

Reference/updating is allowed irrespective of whether internally or externally of transaction. In this case, updating outside the transaction usually is effective. Updating within a transaction also is effective irrespective of commit or abort.

Figure 2:
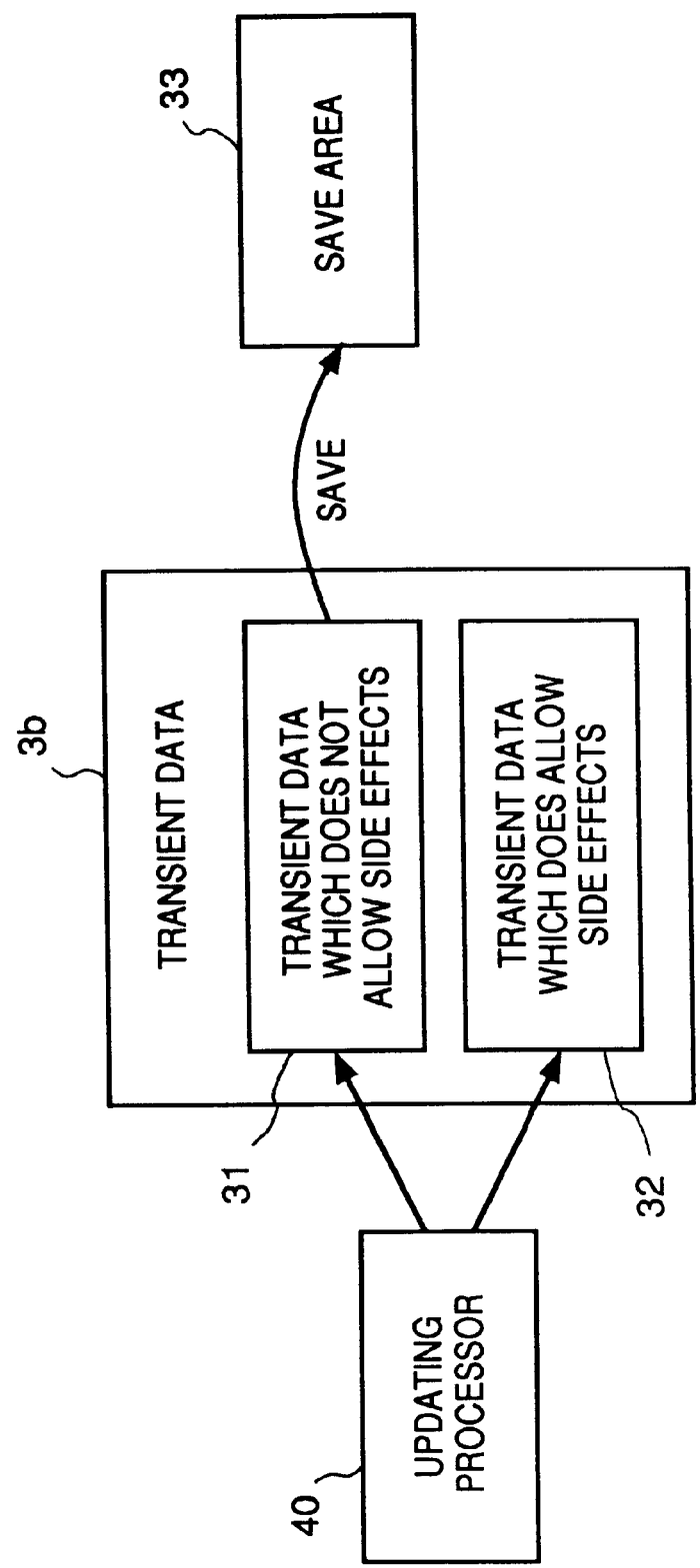
FIG. 2 is a diagram for describing the essentials of processing for updating transient data at the time of a transaction according to the first embodiment.

FIG. 2 is a diagram for describing the essentials of processing for updating transient data at the time of a transaction in a database system according to the first embodiment. As mentioned above, the transient data 3b includes transient data 31 which does not allow side effects and transient data which does allow side effects. In response to start-up of a transaction, the transient data 31 which does not allow side effects is saved in a data-save area 33 within the main memory 3. Thereafter, the transient data 3b is subjected to updating processing by an updating processor 40. A judgment to abort or commit is made when the transaction ends. In the case of an abort, the data in the save area 33 is written back to transient data 31 which does not allow side effects. As a result, the content of the transient data which does not allow side effects is updated only when a commit operation has been performed.

The operating procedure of the first embodiment will be described in greater detail.

Figure 3:
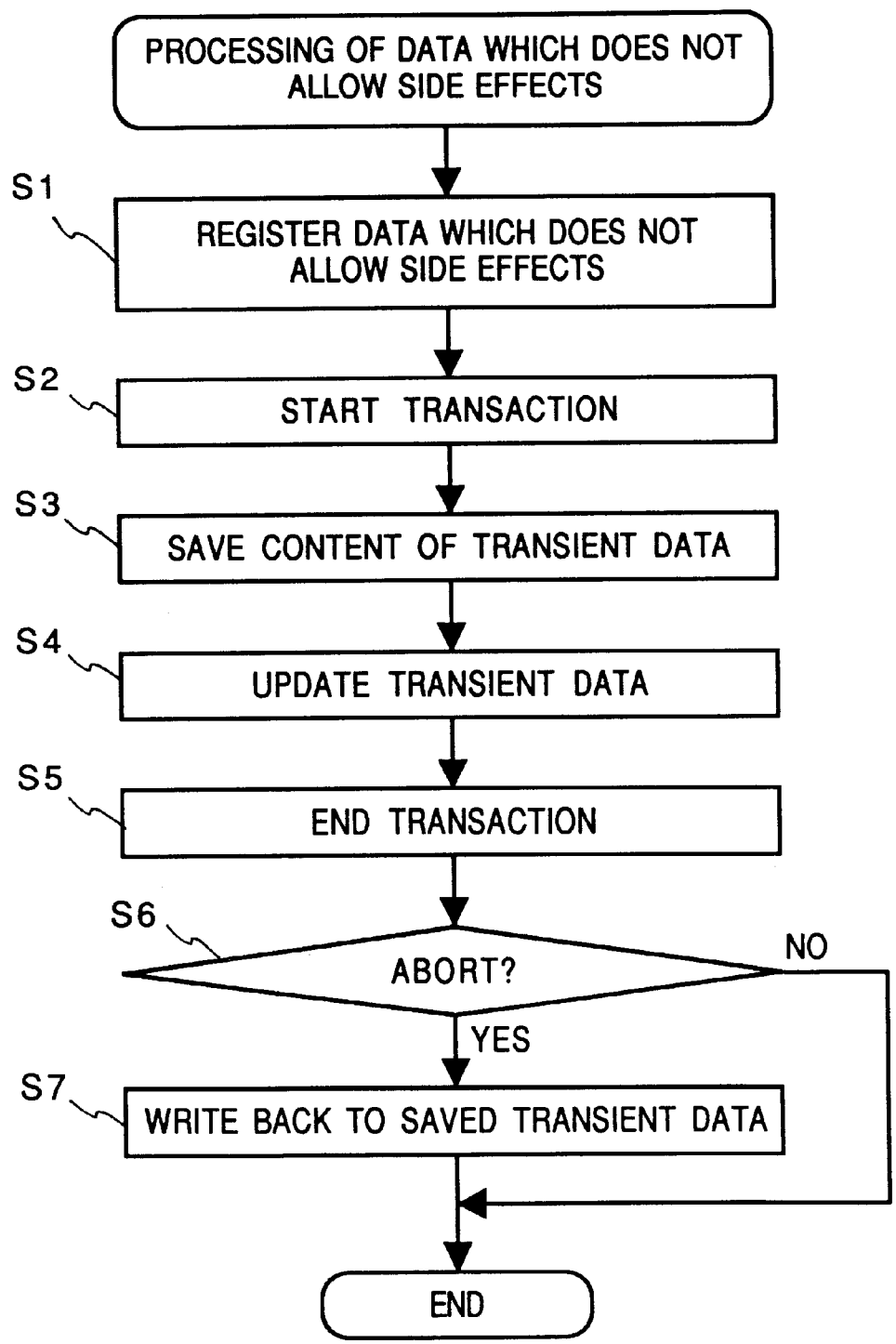
FIG. 3 is a flowchart illustrating a procedure for discarding the content of an update at the time of an abort of an application, this being performed for transient data which does not allow side effects.

FIG. 3 is a flowchart illustrating a procedure for discarding the content of an update when an application is aborted, this being performed for transient data which does not allow side effects. First, this transient data is registered as the transient data 31 before execution of a transaction (step S1). Though registration is carried out using a well-known technique such as table management, here it is performed by a method which does not allow redundancy with regard to identical transient data. When a transaction is started in the application (step S2), the presently prevailing content of the transient data 31 registered as transient data which does not allow side effects is saved in the save area 33 (step S3). Thereafter, the application executes various data processing inclusive of updating of the transient data 3b (step S4), after which the transaction is terminated (step S5).

In this case, there are instances in which the transaction is aborted by the application itself or in response to an external factor. In a case where the transaction has been aborted, the program proceeds from step S6 to step S7. Here the content of the transient data 31 saved in the save area 33 at step S3 is written back in the memory area of the original transient data 31, whereby updating of the transient data 31 which does not allow side effects is invalidated. If the transaction has not been aborted (i.e., if a commit operation has been performed), then processing is terminated as is and, hence, the updating to the transient data 31 is validated.

In the processing above, save processing or recovery processing is not executed with regard to transient data 32, which allows side effects, among the transient data 3b updated. As a result for this data, data update is always validated irrespective of commit/abort of a transaction.

In the first embodiment described above, it is possible to abandon updating at abort of a transaction by previously registering transient data 31 which does not allow side effects and saving the registered data. However, as it is most common in ordinary applications for transient data to be such that side effects should not be allowed, arranging it so that data which allows side effects is given special treatment, is more beneficial in terms of developing application programs. From this point of view, it goes without saying that it is permissible to adopt an arrangement in which the transient data 32 which allows side effects is registered at step S1 in FIG. 3 and unregistered data is saved.

In the first embodiment described above, transient data which does not (or which does) allow side effects is registered in advance. The transient data which allows side effects is saved in the save area 33 of another memory area en masse. However, the method of saving the transient data is not limited to that of the first embodiment. Another saving method will be described in the second embodiment. It should be noted that whereas transient data which does not allow side effects is registered at step S1 of FIG. 3, transient data which does allow side effects is registered in advance in the second embodiment.

Figure 4:
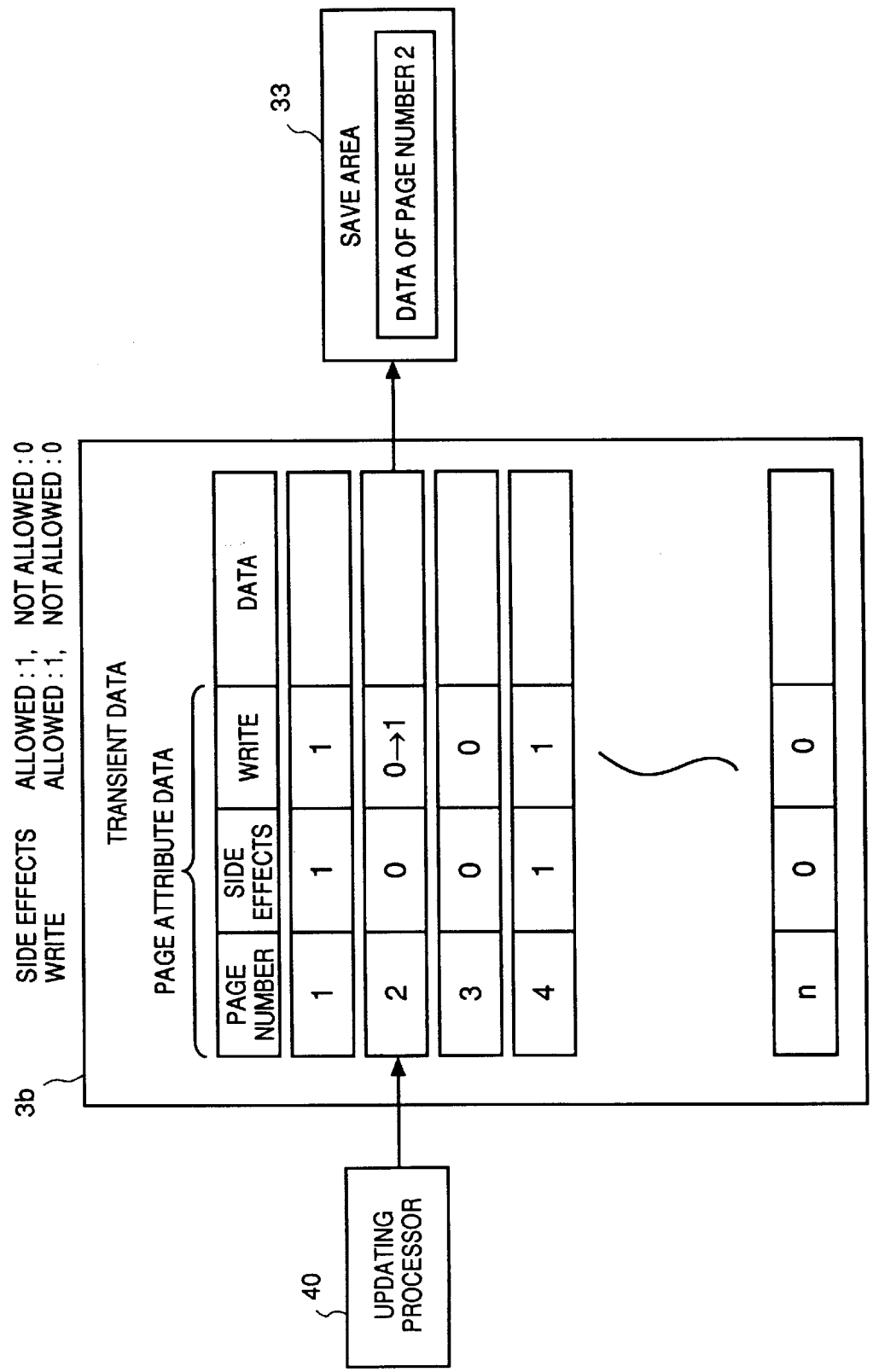
FIG. 4 is a diagram for describing the essentials of processing for updating transient data at the time of a transaction in a second embodiment of the invention.

FIG. 4 is a diagram showing the essentials of processing for updating transient data at the time of transaction processing according to the second embodiment. As shown in FIG. 4, each item of transient data 3b is managed, in page units. Each page has page attribute data indicating "page number", a flag indicating "whether side effects are allowed or not" and "write disabled/enabled". Data which does not allow side effects before updating by the updating processor 40 is stored in the save area 33 in page units.

The operation of the second embodiment will now be described in detail with reference to FIGS. 4 through 6.

Figure 5:
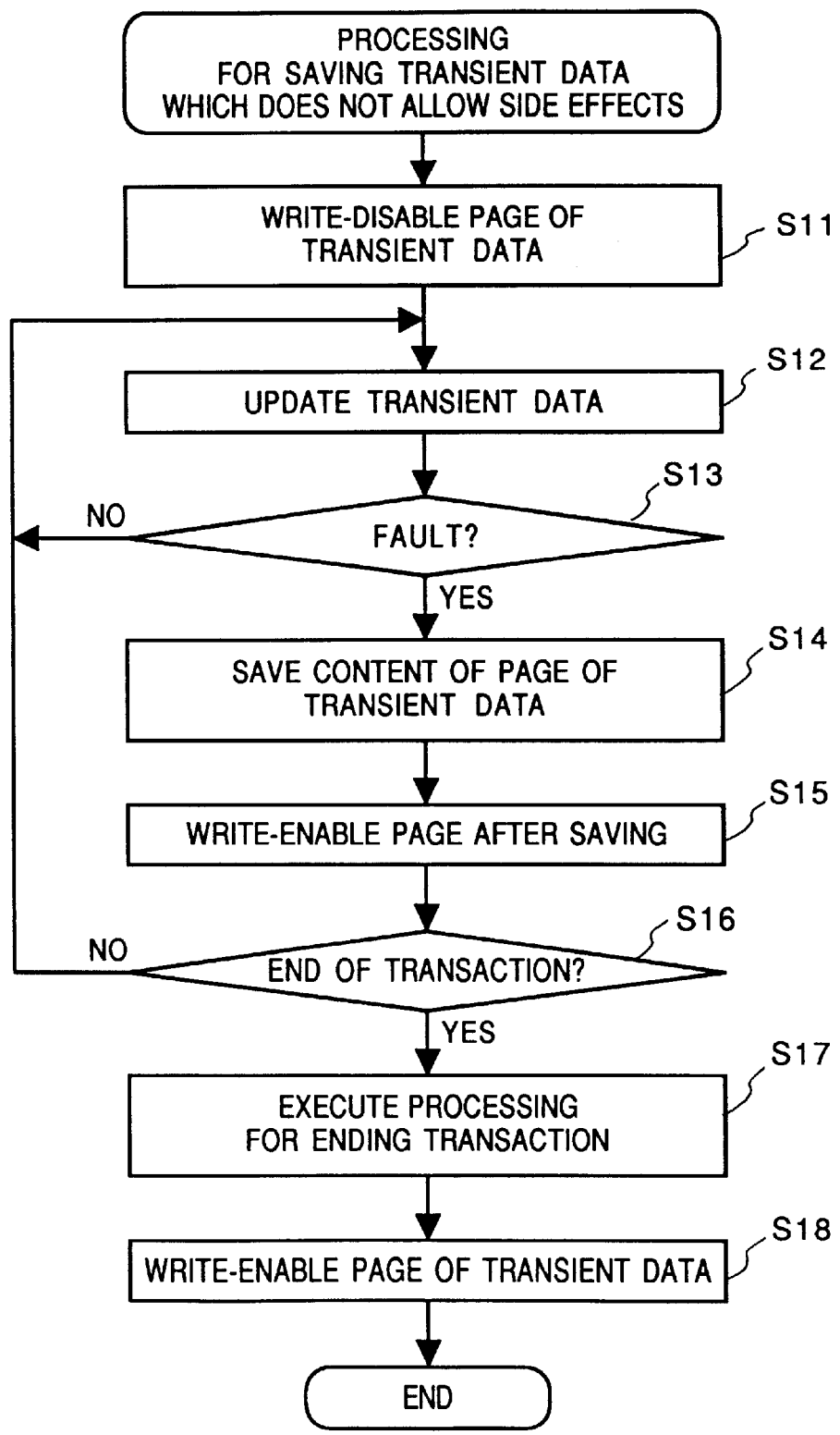
FIG. 5 is a flowchart illustrating a processing procedure for automatically saving transient data in the second embodiment.

FIG. 5 is a flowchart illustrating a processing procedure for automatically saving transient data. This procedure is for the purpose of making it possible to select, at the end of a transaction, acceptance or abandonment of updating of transient data performed during the transaction. Here transient data which allows side effects is placed on one page, transient data which does not allow side effects is placed on a different page, and a description as to whether or not side effects are allowed is given as a page attribute.

First, at the start of a transaction, the attribute of a page on which transient data which does not allow side effects has been placed is write-disabled (step S1). For example, the page attributes of pages 2, 3, n in FIG. 4 are write-disabled. Whether the transient data of each page allows side effects or not is judged by referring to the attribute of the page on which the transient data has been placed. This procedure is implemented by using an operating system which provides a virtual memory management function. This is followed by updating the transient data in the application (step S12). Since an access exception occurs with regard to an attribute whose writing has been prohibited at step S11, the content of the page which gave rise to the access exception is saved in the save area 33 (steps S13–S14) and the page attribute is write-enabled (step S15). By virtue of the foregoing processing, processing of transient data during a transaction is preserved both before and after updating. The processing of steps S12–S15 is repeated until the transaction ends (step S16).

For example, as shown in FIG. 4, when the transient data of page number 2 which does not allow side effects is accessed by the updating processor 40 for the purpose of updating the data, processing is executed as follows: First, since the page attribute of the data on page number 2 is "write disabled", updating processing by the updating processor 40 becomes a fault. Accordingly, processing proceeds to step S14, at which the data on page number 2 is saved in the save area 33. This is followed by step S15, at which the page attribute of page number 2 is "write enabled". When access to the data on page number 2 by the updating processor 40 is re-executed, the page attribute now will be "write enabled" and therefore data updating is executed.

When the transaction is finished, processing for ending the transaction is executed (step S17). In dependence upon whether a commit operation or abort operation has been made with regard to transient data which does not allow side effects, whether data before updating or data after updating is to be used as the result is selected. Finally, since the content of the update is always valid outside the transaction, it is unnecessary to preserve the content before updating owing to access fault. Consequently, the page attribute of the page on which the transient data has been placed is write-enabled and processing is terminated (step S18).

Figure 6:
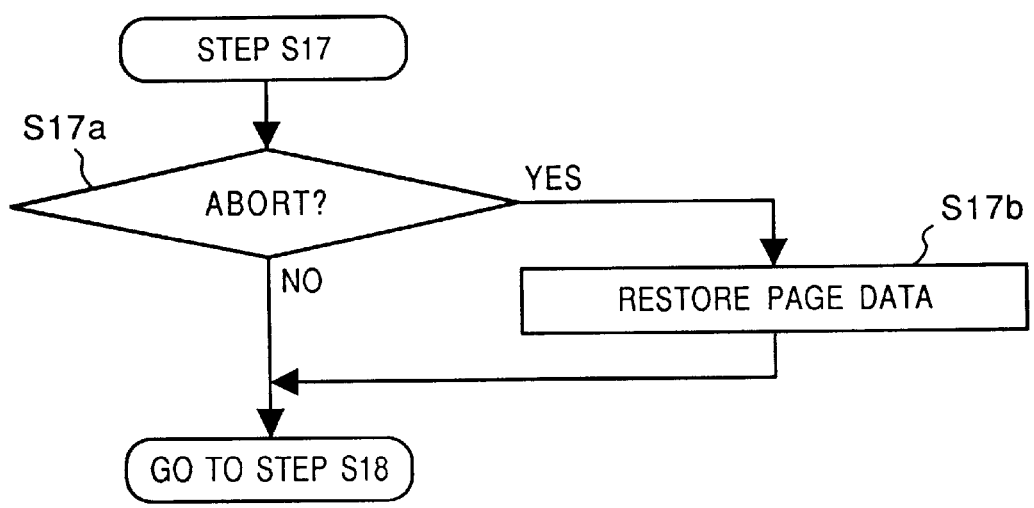
FIG. 6 is a flowchart for describing processing at the end of a transaction in the second embodiment.

FIG. 6 is a flowchart illustrating the processing of step S17 in detail. Specifically, at step S17a, it is determined whether the end of the transaction has been brought about by an abort of the transaction. In a case where the transaction is not aborted but is ended by a commit, step S17 is terminated as is and the data on each page currently preserved as transient data 3b is kept as is. In a case where the transaction is aborted, the program proceeds to step S17b, where the data on each page that has been saved in the save area 33 is written back to the corresponding page of the transient data 3b. By thus ending step S17, the transient data is restored to the state which prevailed prior to the execution of the transaction and this data is kept.

In the foregoing processing, transient data which allows side effects is placed on a page separate from that of transient data which does not allow side effects, and write-disable processing of the page at step S11 is not executed. Accordingly, an access exception does not occur in updating of transient data which allows side effects and, as a result, the content of the page is not saved. Consequently, updating of content is accepted irrespective of transaction commit or abort, and the updated content is always valid. A technique for distinguishing allocation of pages is to make a designation relating to side effects by means of a special keyword in descriptive language in the development of an application and then distinguish assignment of pages in a conversion program (interpreter or compiler) for the descriptive language.

In accordance with the second embodiment, as described above, whether side effects are allowed or not is described beforehand in the form of a page attribute, and saving of data is executed on the basis of this description. Therefore, the saving of attribute data which requires to be saved is executed automatically. Furthermore, of the transient data which does not allow side effects, save processing is executed with regard to the data for which updating processing has occurred. As a result, processing efficiency is higher than in the first embodiment.

Thus, as described above, the database system according to each of the foregoing embodiments has a mechanism for handling transient data in applications which employ databases. At the time of a commit operation, the mechanism accepts the content of an update during the course of transaction processing and, at the time of an abort operation, discards the content of the update. This solves, the problem of adjustability in data processing of mixed data composed of persistent data in a database and transient data in an application, viz., the problem in which, even though updating of persistent data has been abandoned, the updating of the associated transient data is not. This facilitates development of application programs and eliminates causes of erroneous operation.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:

memory means for storing a plurality of data;

updating means for updating data stored in said memory means in a transaction;

setting means for setting, with regard to each of the plurality of data stored in said memory means, whether updated data updated by said updating means is to be validated or invalidated at abortion of the transaction, respectively, said setting means performing its setting in advance of the transaction;

saving means for saving data, for which updated data has been set to be invalidated at abortion of the transaction by said setting means, except for data for which updated data has been set to be validated at abortion of the transaction by said setting means, before execution of data update by said updating means; and control means for invalidating the updated data set to be invalidated by restoring the data saved by said saving means and for validating the updated data set to be validated by maintaining the updated data for which data before execution of updating has not been saved at an end of the transaction if the transaction has been aborted.

2. The apparatus according to claim 1, further comprising database means for storing persistent data, wherein said memory means stores transient data and said updating means updates the persistent data and the transient data in the transaction.

3. The apparatus according to claim 2, wherein the updated persistent data is discarded at the end of the transaction if the transaction has been aborted.

4. An information processing apparatus comprising:
   memory means having a plurality of pages each for storing data;
   updating means for updating data stored in the plurality of pages;
   setting means for setting, for each page as a page attribute, whether updated data in a page updated by said updating means is to be validated or invalidated at abortion of the transaction, respectively, said setting means performing its setting in advance of the transaction;
   saving means for saving the data of a page, in a case where the page for which updated data has been set to be invalidated at abortion of the transaction by said setting means is accessed; and
   control means for invalidating the updated in the page set to be invalidated by restoring the data of the page saved by said saving means and for validating the updated data in the page set to be validated by maintaining the updated data at an end of the transaction if the transaction has been aborted.

5. The apparatus according to claim 4, further comprising data base means for storing persistent data, wherein said memory means stores transient data in the pages and said updating means updates the persistent data and the transient data in the transaction.

6. The apparatus according to claim 5, wherein the persistent data is discarded at the end of the transaction if the transaction has been aborted.

7. The apparatus according to claim 4, wherein said setting means sets the page attribute of the page to be discarded at the abortion of the transaction, as data update-disable, and, in a case where a page for which the attribute has been set as data update-disable is accessed in the transaction, said saving means saves the data of this page.

8. The apparatus according to claim 7, further comprising canceling means for canceling an update-disable page attribute, which has been set by said setting means at the end of the transaction.

9. An information processing method comprising:
   a setting step of setting, with regard to each of a plurality of data stored in a memory, whether updated data is to be validated or invalidated at abortion of a transaction, respectively, said setting step being performed in advance of the transaction;
   a saving step of saving data, for which updated data has been set to be validated in said setting step, except for data for which updated data has been set to be validated at abortion of the transaction in said setting step, before execution of data update in the transaction;
   an updating step of executing the update of each data in the memory, in the transaction; and
   a control step of invalidating the updated data set to be invalidated by restoring the data saved in said saving step and of validating the updating the updated data set to be validated by maintaining the updated data for which data before execution of updating has not been saved at an end of the transaction if the transaction has been aborted.

10. The method according to claim 9, further comprising a storing step of storing persistent data to a database, wherein the memory stores transient data and said updating step updates the persistent data and the transient data in the transaction.

11. The method according to claim 10, wherein the updated persistent data is discarded at the end of the transaction if the transaction has been aborted.

12. An information processing method comprising:
    a setting step of setting, for each page stored in a memory as a page attribute, whether updated data in a page is to be validated or invalidated at abortion of a transaction, respectively, in advance of the transaction;
    a saving step of saving the data of this page, in a case where a page for which updated data has been set to be invalidated at abortion of the transaction at said setting step is accessed;
    an updating step of executing the update of each data of the page stored in the memory; and
    a control step of invalidating the updated data in the page set to be invalidated by restoring the data of the page saved at said saving step and of validating the updated data in the page set to be validated by maintaining the updated data at an end of the transaction if the transaction has been aborted.

13. The method according to claim 12, further comprising a storing step of storing persistent data in a data-base, wherein the memory stores transient data in the pages, and said updating step updates the persistent data and the transient data in the transaction.

14. The method according to claim 13, wherein the persistent data is discarded at the end of the transaction if the transaction has been aborted.

15. The method according to claim 12, wherein said setting step sets the page attribute of the page to be discarded at the abortion of the transaction, as data update-disable, and, in a case where a page for which the attribute has been set as data update-disable is accessed in the transaction, said saving step saves the data of this page.

16. The method according to claim 15, further comprising a canceling step of canceling an update-disable page attribute, which has been set at said saving step, at the end of the transaction.

* * * * *